(12) United States Patent
Gill

(10) Patent No.: US 7,256,972 B2
(45) Date of Patent: Aug. 14, 2007

(54) CPP SENSOR WITH IMPROVED PINNING STRENGTH LONGITUDINAL BIAS STRUCTURE

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 383 days.

(21) Appl. No.: 10/882,472

(22) Filed: Jun. 30, 2004

(65) Prior Publication Data

US 2006/0002042 A1    Jan. 5, 2006

(51) Int. Cl.
*G11B 5/39* (2006.01)

(52) U.S. Cl. .................................. 360/324.12

(58) Field of Classification Search ........... 360/324.12, 360/324.2
See application file for complete search history.

(56) References Cited

U.S. PATENT DOCUMENTS

| | | | |
|---|---|---|---|
| 6,074,707 A | 6/2000 | Nakazawa et al. | 427/547 |
| 6,340,533 B1 | 1/2002 | Ueno et al. | 428/611 |
| 6,542,341 B1 | 4/2003 | Carey et al. | 360/324 |
| 2002/0085323 A1* | 7/2002 | Smith et al. | 360/324.12 |
| 2003/0053267 A1 | 3/2003 | Horng et al. | 360/324.1 |
| 2003/0156361 A1 | 8/2003 | Li et al. | 360/324.12 |
| 2003/0179517 A1 | 9/2003 | Horng et al. | 360/324.12 |
| 2004/0061982 A1 | 4/2004 | Lin et al. | 360/324.1 |
| 2004/0061983 A1 | 4/2004 | Childress et al. | 360/324.2 |

OTHER PUBLICATIONS

Pakala, M. et al, "Effect of film microstructure on exchange bias of IrMn/CoFe films," IEEE Transactions on Magnetics, vol. 36, Issue 5, Sep. 2000.

* cited by examiner

*Primary Examiner*—Julie Anne Watko
(74) *Attorney, Agent, or Firm*—Zilka-Kotab, PC

(57) ABSTRACT

A current perpendicular to plane (CPP) sensor having an in stack bias layer having a desired negative magnetostriction for efficient biasing of the free layer. The sensor includes a free layer, a pinned layer and a first spacer layer sandwiched between the free layer and the pinned layer. The sensor further includes an in stack bias structure disposed adjacent to the free layer, opposite the first spacer layer. The in stack bias structure includes a layer of CoFe exchange coupled with a layer of antiferromagnetic (AFM) material. A layer of CoX is then exchange coupled to the layer of CoFe. The element X can be selected from the material including B, Si, SiB, Ni, Nb, and Y.

30 Claims, 3 Drawing Sheets

CPP SENSOR WITH IMPROVED PINNING STRENGTH LONGITUDINAL BIAS STRUCTURE

FIELD OF THE INVENTION

The present invention relates to giant magnetoresistive (GMR) sensors and more particularly to a current perpendicular to plane (CPP) sensor having improved pinning strength.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for increased data rate and data capacity, researchers have recently been focusing their efforts on the development of perpendicular recording systems. A traditional longitudinal recording system stores data as magnetic bits oriented longitudinally along a track in the plane of the surface of the magnetic disk. This longitudinal data bit is recorded by a fringing field that forms between a pair of magnetic poles separated by a write gap. A perpendicular recording system, on the other hand, records data as magnetic transitions oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole.

The advent of perpendicular recording systems has lead to an increased interest in Current perpendicular to plane (CPP) sensors, which are particularly suited to use in perpendicular recording systems, due to their ability to read signals from the high coercivity medium. A CPP sensor differs from a more conventional current in plane (CIP) sensor such as that discussed above in that the sense current flows through the CPP sensor from top to bottom in a direction perpendicular to the plane of the layers making up the sensor. Whereas the more traditional CIP sensor has insulation layers separating it from the shields, the CPP sensor contacts the shields at its top and bottom surfaces, thereby using the shields as leads.

In prior art sensors magnetic biasing for the free layer has been provided by forming hard magnetic bias layers at each lateral side of the sensor. Since such sensors were CIP sensors, the flow of current through the electrically conductive hard magnetic bias layers was not a problem, and was actually desired. However, in a CIP sensor such bias layers would allow current to be shunted through the bias layers form one shield to the other, bypassing the sensor. This, of course, would be unacceptable. Therefore, in order to prevent such shunting, an insulation layer must be provided at the sides of the sensor and extending over at least one of the leads, separating the sensor from the hard bias layers. Unfortunately, the resulting separation between the hard bias layers and the sensor results in diminished biasing efficiency.

Therefore, there is a need for a mechanism for biasing a free layer of a CPP sensor. Such a biasing scheme would preferably be an in stack bias system since that would eliminate the possibility of shunting current from one shield to another. Such a system could include a layer of high magnetic moment material exchange couple to a layer of antiferromagnetic (AFM) material and magnetostatically coupled to the free layer. Unfortunately, available high moment materials that are capable of strongly exchange coupling with a desired AFM material also have strong positive magnetostriction, which generates a strong magnetic anisotropy in a direction perpendicular to the ABS, perpendicular to the desired direction.

Therefore, there remains a need for an in stack bias layer that can be used in a CPP sensor that can provide efficient biasing without also inducing a magnetic anisotropy perpendicular to the ABS. Such a bias layer would also preferably make use of an AFM layer different than that used to pin the pinned layer and having a lower blocking temperature, thereby allowing the biasing to be set without disrupting the setting of the pinned layer.

SUMMARY OF THE INVENTION

The present invention provides a current perpendicular to plane (CPP) giant magnetoresistive (GMR) sensor having an in stack bias layer that provides efficient free layer biasing, while exhibiting a zero or negative net magnetostriction. The sensor includes a free layer, a pinned layer and a first spacer layer sandwiched between the free layer and the pinned layer. The sensor further includes an in stack bias structure disposed adjacent to the free layer, opposite the first spacer layer. The in stack bias structure includes a layer of CoFe exchange coupled with a layer of antiferromagnetic (AFM) material. A layer of CoX is then exchange coupled to the layer of CoFe. The element X can be selected from the material including: B, Si, SiB, Ni, Nb, and Y.

The CoFe layer advantageously provides exceptional exchange coupling with the AFM material, which may be for example IrMn.

The CoX layer advantageously provides a negative magnetostriction that counteracts the undesirable positive magnetostriction of the CoFe layer. The relative thicknesses of the CoX and CoFe layers can advantageously be chosen so as to either provide a net zero magnetostriction or, more preferably, to provide a net negative magnetostriction.

The CoFe layer can have a concentration of 25 to 35 atomic percent Fe or about 30 atomic percent Fe. The CoFe layer and the CoX layers can have thicknesses that when summed together equal the thickness of the free layer. In addition, the CoX layer can be constructed to be at least as thick as the CoFe layer in order to provide the net zero or net negative magnetostriction desired. For example, the free layer can be constructed to have a thickness of about 30 Angstroms and the CoFe layer and CoX layer can each be constructed to have a thickness of about 15 Angstroms. The product of the magnetostriction of the CoX layer multiplied by its thickness is preferably equal to or greater than the product of the magnetostriction of the CoFe layer multiplied by its thickness, thereby assuring a net zero or net negative magnetostriction. If the layer of CoX is actually CoB, then layer can include about 15 to 25 atomic percent B or about 20 atomic percent B.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
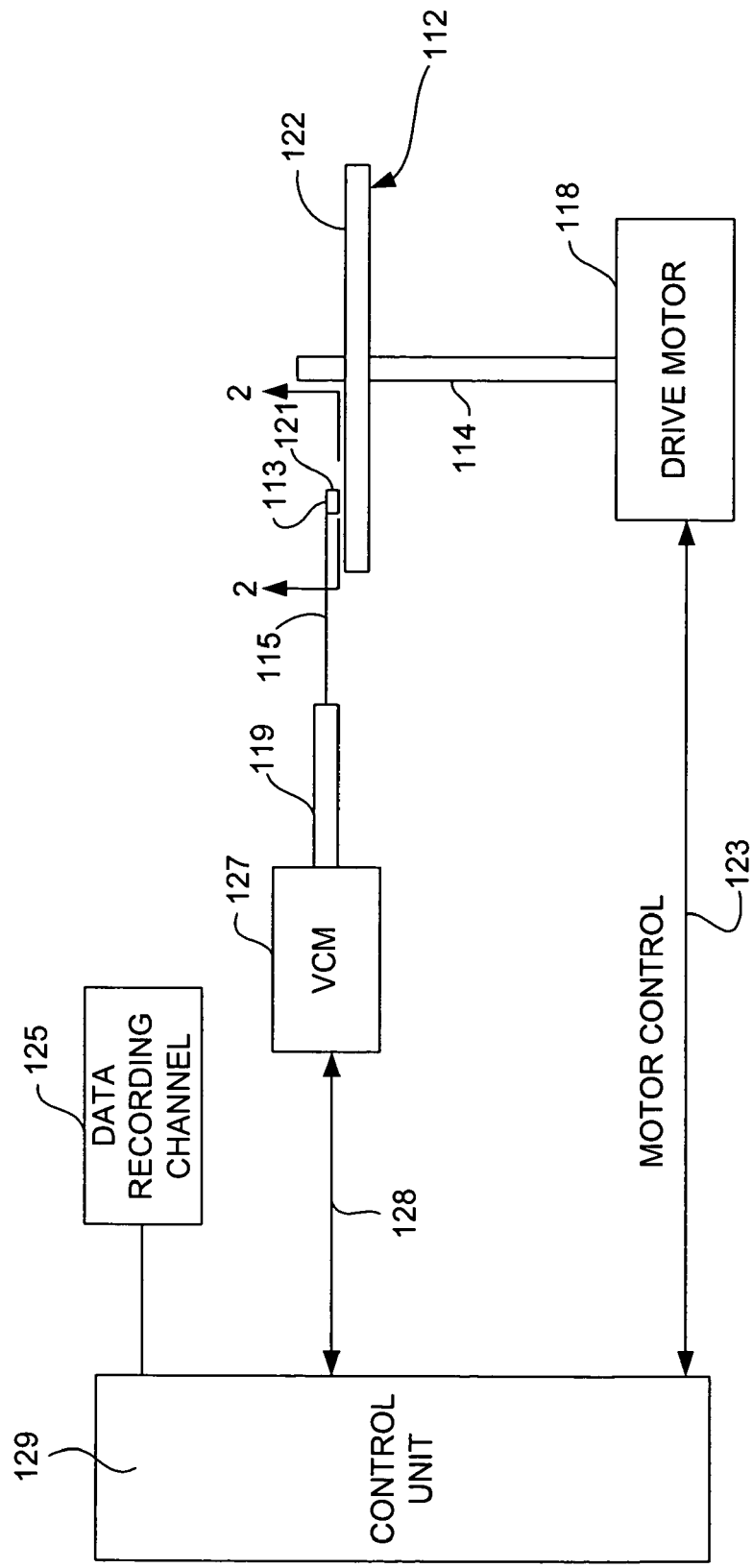
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
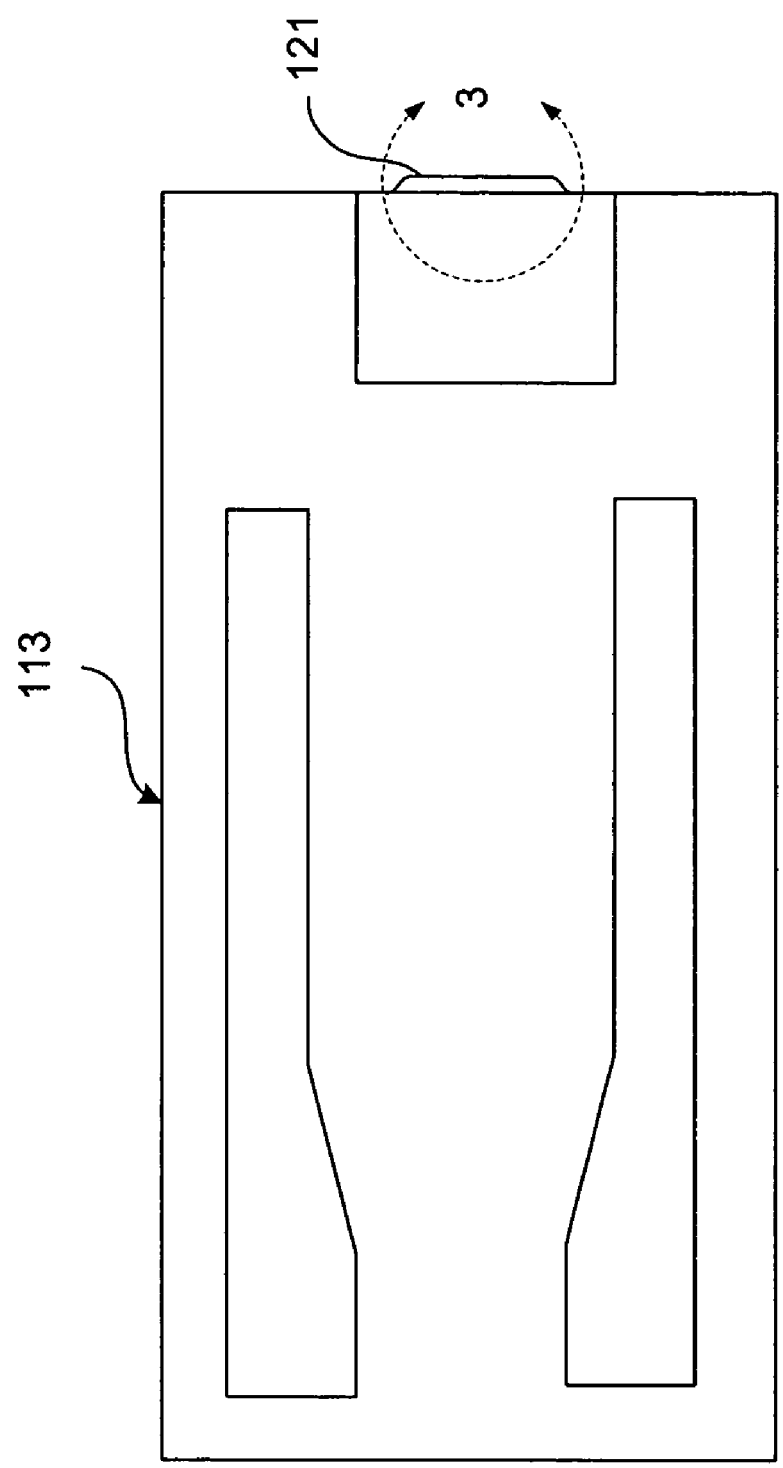
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
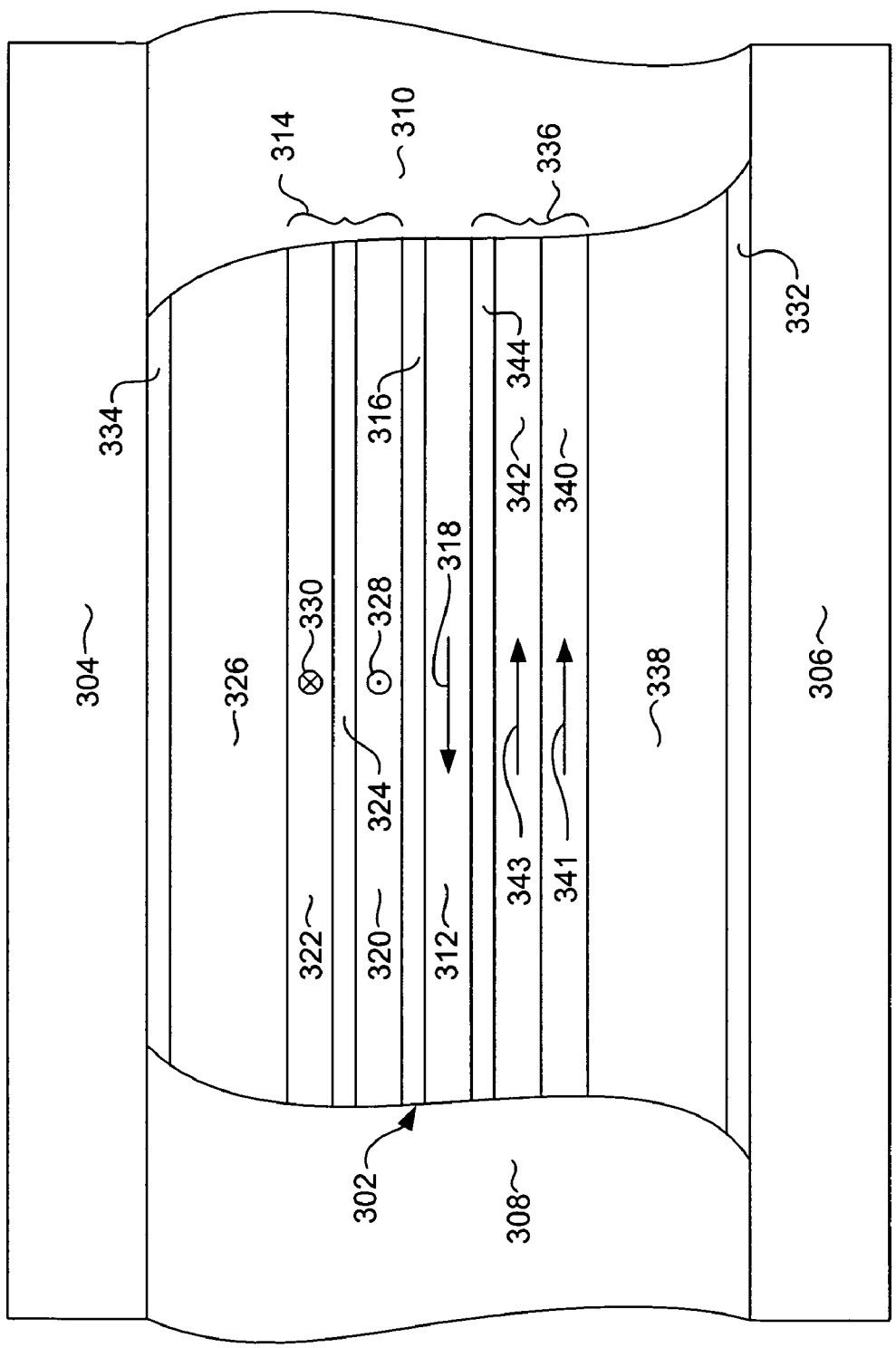
FIG. 3 is an ABS view of a magnetic sensor according to an embodiment of the present invention taken from circle 3 of FIG. 2.

With reference now to FIG. 3, a magnetoresistive sensor 300 according to an embodiment of the invention includes a magnetoresistive sensor element or sensor stack 302, sandwiched between first and second leads 304, 306. The first and second leads 304, 306 can be constructed of an electrically conductive, magnetic material such as NiFe and can thereby serve as magnetic shields as well as leads. First and second insulation layers 308, 310 extend laterally from the sides of the sensor stack 302 and fill the space between the leads 304, 306.

The sensor stack includes a free layer 312, a pinned layer structure 314 and a non-magnetic spacer layer 316 sandwiched there between. The free layer can be constructed of a magnetic material such as Co, CoFe, NiFe or a combination thereof and has a magnetic moment that is biased in a direction parallel with the ABS as indicated by arrow 318. Although the magnetic moment 318 of the free layer is biased parallel with the ABS it is free to rotate in response to a magnetic field.

The pinned layer preferably includes first and second ferromagnetic layers 320, 322, which are antiparallel coupled across a non-magnetic, electrically conductive coupling layer 324 such as Ru. The outermost ferromagnetic layer 322 can be exchange coupled with an antiferromagnetic layer 326 such as PtMn which strongly pins the magnetic moments 328, 330 of the ferromagnetic layers 320 322. Alternatively, the pinned layer could be a self pinned structure, in which case there would be no AFM layer 326, and the moment of the pinned layer would be set by stress induced anisotropy provided by positive magnetostriction of the ferromagnetic layers 320, 322.

A seed layer 332 may be provided at the bottom of the sensor to initiate a desired grain structure in the subsequently deposited layers. The seed layer 332 may be for example NiFeCr, NiFe or some other suitable material. In addition, a capping layer 334 such as Ta may be provided at the top of the sensor stack 302 to protect the sensor stack from damage during various manufacturing processes.

With continued reference to FIG. 3, an in stack bias structure 336 is provided adjacent to the free layer 312 opposite the pinned layer 314 to provide magnetic biasing for the moment 318 of the free layer 312. The bias structure includes a layer of antiferromagnetic (AFM) material 338. The AFM layer 338 is preferably constructed of a material that is different than the AFM material 326 used to pin the pinned layer, so that the two AFM layers 326, 338 have different blocking temperatures from one another. Preferably the AFM layer 338 has a lower blocking temperature than the AFM layer 326. More preferably, the AFM layer 338 of the bias structure 336 is IrMn, whereas the AFM layer 326 of the pinned layer 314 is PtMn.

The bias structure 336 also includes a layer of CoFe 340 formed on top of and exchange coupled with the AFM layer 338. The CoFe layer preferably has a Fe content of 25 to 35 atomic percent Fe or about 30 atomic percent Fe. A layer of CoX 342 is provided on top of the CoFe layer 340 and is exchange coupled with the CoFe layer 340. The element X is a material that when added to Co causes the material to have a negative magnetostriction. X can be for example B, Si, SiB, Ni, Nb or Y. The element X is preferably boron (B) or a combination of B and Si, for reasons that will be described below.

Finally, the bias structure 336 includes a non-magnetic, electrically conductive spacer layer 344. The spacer layer 344 is constructed of such a thickness that it will magnetostatically couple the magnetic layers 342, 340 of the bias structure 336 with the free layer 312. The spacer layer 344 can be for example Cu, Ru, Ta or some other material and can have a thickness of 15 to 25 Angstroms or about 20 Angstroms. Exchange coupling of the CoFe layer 340 with the AFM layer 338 causes the CoFe layer 340 to have a magnetic moment 341 that is strongly pinned in a direction parallel with the ABS 338. Since the CoX layer 342 is exchange coupled with the CoFe layer 340 it will also have a magnetic moment 343 oriented in the same direction parallel with the ABS. The magnetostatic coupling of the free layer 312 with the CoFe and CoX layers causes the moment 318 to be biased antiparallel with the moments 341, 343 of the CoFe and CoX layers.

The CoFe layer 340 exhibits excellent exchange coupling with the AFM layer 338 and has an advantageous high moment, but it has an undesirable positive magnetostriction. The positive magnetostriction of the CoFe layer 340 causes an undesirable magnetic anisotropy perpendicular to the ABS. The CoX material 342, however, has a desirable negative magnetostriction, which when deposited over the CoFe layer 340 results in net zero or negative magnetostriction.

By selecting the relative thicknesses of the CoFe and CoX layers 340, 342, the amount of net negative magnetostriction can be controlled. The magnetostriction on of each layer 340, 342 is the magnetostriction constant of the material (lambda) multiplied by the thickness of the material, in addition, the combined magnetic thicknesses of the CoFe and CoX layers 340, 342 should be about equal to the magnetic thickness of the free layer 312. This will provide the most efficient magnetostatic coupling across the spacer layer 344 and therefore will result in the most efficient biasing of the free layer 312. By way of example the CoFe and (CoX layers can each have a thickness of 10 to 20 Angstrom is or about 15 Angstroms, and the free layer 312 can have a thickness of about 30 Angstroms.

Constructing the CoX layer 342 as CoB has additional advantages over those discussed above. It has been found that the addition of B causes the underlying CoFe layer to have even greater exchange coupling with the underlying AFM layer 338. Therefore, although the element X may be selected from one of many materials that will cause CoX to have a negative magnetostriction, X is preferably boron (B).

While various embodiments have been described above, it should be understood that they have been presented by way of example only, and not limitation. For example, although the sensor stack 302 was described as having the free layer at the bottom, it could also be constructed with the free layer at the top. The inventive concepts of the present invention contemplate such a structure. In addition, the one or more of the shields could be configured to extend down the sides of the sensor to form a conformal shield. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A current perpendicular to plane (CPP) sensor, comprising:
   a magnetic pinned layer;
   a magnetic free layer;
   a non-magnetic first spacer layer separating the free layer and the pinned layer; and
   an in stack bias structure disposed adjacent to the free layer opposite the first spacer layer, the in stack bias structure further comprising:
   an antiferromagnetic layer (AFM layer);
   a layer of CoFe exchange coupled with the AFM layer;
   a layer comprising CoX, exchange coupled to the layer of CoFe, the element X comprising a material selected from the group consisting of B, Si, SiB Ni, Nb, and Y; and
   a second spacer layer separating the free layer from the layer comprising CoX.

2. A sensor as in claim 1, wherein the second spacer layer is constructed of a thickness to magnetostatically couple the free layer and the layer comprising CoX.

3. A sensor as in claim 1, wherein the free layer has a magnetic thickness that is substantially equal to magnetic thickness of the layer of CoFe plus the magnetic thickness of the layer comprising CoX.

4. A sensor as in claim 1 wherein the layer comprising CoX has a thickness that is substantially equal to a thickness of the layer of CoFe.

5. A sensor as in claim 1 wherein the layer comprising CoX has a thickness that is at least as great as a thickness of the layer of CoFe.

6. A sensor as in claim 1 wherein the layer comprising CoX is thicker than the layer of CoFe.

7. A sensor as in claim 1 wherein the AFM layer comprises IrMn.

8. A sensor as in claim 1 wherein the AFM layer comprises IrMn, and wherein the pinned layer is pinned by exchange coupling with a layer of PtMn.

9. A sensor as in claim 1, wherein the second spacer layer has a thickness of about 20 Angstroms.

10. A sensor as in claim 1 wherein the second spacer layer comprises Ru.

11. A sensor as in claim 1 wherein the second spacer layer comprises Cu.

12. A sensor as in claim 1 wherein the second spacer layer comprises Cu and Ru.

13. A sensor as in claim 1 wherein the first spacer layer is a non-magnetic electrically conductive material.

14. A sensor as in claim 1 wherein the first spacer layer comprises Cu.

15. A sensor as in claim 1 wherein the first spacer layer is a non-magnetic, electrically insulating material.

16. A sensor as in claim 1 wherein the first spacer layer comprises $Al_2O_3$.

17. A sensor as in claim 1 wherein the free layer is formed beneath the pinned layer, and wherein the in stack bias structure is formed beneath the free layer.

18. A sensor as in claim 1 wherein the free layer is formed above the pinned layer, and wherein the in stack bias structure is formed above the free layer.

19. A sensor as in claim 1 further comprising a seed layer formed at the bottom of the sensor.

20. A sensor as in claim 1 wherein the CoFe layer has a concentration of 25 to 35 atomic percent Fe.

21. A sensor as in claim 1 wherein the CoFe layer has a concentration of about 30 atomic percent Fe.

22. A sensor as in claim 1 wherein the CoX layer comprises 15 to 25 atomic percent X.

23. A sensor as in claim 1 wherein the CoX layer comprises about 18 atomic percent X.

24. A current perpendicular to plane (CPP) sensor, comprising:
   a magnetic pinned layer;
   a magnetic free layer;
   a non-magnetic first spacer layer separating the free layer and the pinned layer; and
   an in stack bias structure disposed adjacent to the free layer opposite the first spacer layer, the in stack bias structure further comprising:
   an antiferromagnetic layer (AFM layer);
   a layer of CoFe exchange coupled with the AFM layer;
   a layer comprising CoX, exchange coupled to the layer of CoFe, the element X comprising a material selected from the group consisting B, Si, SiB, Ni, Nb, and Y; and
   a second spacer layer separating the free layer from the layer comprising CoX; wherein:
   the layer comprising CoX has a first magnetostriction and a first thickness;
   the layer of CoFe has a second magnetostriction and a second thickness; and
   the product of the first magnetostriction and the first thickness is greater than the product of the second magnetostriction and the second thickness.

25. A current perpendicular to plane (CPP) sensor, comprising:
   a magnetic pinned layer;
   a magnetic free layer;
   a non-magnetic first spacer layer separating the free layer and the pinned layer; and
   an in stack bias structure disposed adjacent the free layer opposite the first spacer layer, the in stack bias structure further comprising:
   an antiferromagnetic layer (AFM layer);
   a layer of CoFe exchange coupled with the AFM layer;
   a layer comprising CoX, exchange coupled to the layer of CoFe, the element X comprising a material selected from the group consisting of B, Si, SiB, Ni, Nb, and Y; and
   a second spacer layer separating the free layer from the layer comprising CoX;
   wherein the second spacer layer comprises Ta.

26. A current perpendicular to plane (CPP) sensor, comprising:
   a seed layer comprising NiFeCr formed at the bottom of the sensor;
   a magnetic pinned layer;

a magnetic free layer;

a non-magnetic first spacer layer separating the free layer and the pinned layer; and an in stack bias structure disposed adjacent to the free layer opposite the first spacer layer, the in stack bias structure further comprising:

an antiferromagnetic layer (AFM layer);

a layer of CoFe exchange coupled with the AFM layer;

a layer comprising CoX, exchange coupled to the layer of CoFe, the element X comprising a material selected from the group consisting of B, Si, SiB, Ni, Nb, and Y; and a second spacer layer separating the free layer from the layer comprising CoX.

27. A current perpendicular to plane (CPP) sensor, comprising:

a seed layer comprising NiFe formed at the bottom of the sensor;

a magnetic pinned layer;

a magnetic free layer;

a non-magnetic first spacer layer separating the free layer and the pinned layer; and an in stack bias structure disposed adjacent to the free layer opposite the first spacer layer, the in stack bias structure further comprising:

an antiferromagnetic layer (AFM layer);

layer of CoFe exchange coupled with the AFM layer;

a layer comprising CoX, exchange coupled to the layer of CoFe, the element X comprising a material selected from the group consisting of B, Si, SiB, Ni, Nb, and Y; and a second spacer layer separating the free layer from the layer comprising CoX.

28. A current perpendicular to plane (CPP) sensor, comprising:

a magnetic pinned layer;

a magnetic free layer;

a non-magnetic first spacer layer separating the free layer and the pinned layer; and an in stack bias structure disposed adjacent to the free layer opposite the first spacer layer, the in stack bias structure further comprising:

an antiferromagnetic layer (AFM layer);

a layer of CoFe exchange coupled with the AFM layer;

a layer comprising CoX, exchange coupled to the layer comprising CoFe, the element X comprising a material selected from the group consisting of B, Si, SiB, Ni, Nb, and Y; and a second spacer layer separating the free layer from the layer comprising CoX.

29. A current perpendicular to plane (CPP) sensor, comprising:

a magnetic pinned layer;

a magnetic free layer;

a non-magnetic first spacer layer separating the free layer and the pinned layer; and an in stack bias structure disposed adjacent to the free layer opposite the first spacer layer, the in stack bias structure further comprising:

an antiferromagnetic layer (AFM layer);

a layer of CoFe exchange coupled with the AFM layer;

a layer comprising CoB and having about 20 atomic percent B, exchange coupled to the layer of CoFe; and a second spacer layer separating the free layer from the layer comprising CoX.

30. A magnetic data recording system, comprising:

a magnetic disk;

a motor connected with the magnetic disk for rotating the magnetic disk;

slider;

an actuator connected with the slider for moving the slider adjacent to the magnetic disk;

a magnetic head connected with the slider, the magnetic head including a current perpendicular to plane (CPP) magnetoresistive sensor, the sensor further comprising:

a magnetic pinned layer;

a magnetic free layer;

a non-magnetic first spacer layer separating the free layer and the pinned layer; and an in stack bias structure disposed adjacent to the free layer opposite the first spacer layer, the in stack bias structure further comprising:

an antiferromagnetic layer (AFM layer);

a layer of CoFe exchange coupled with the AFM layer;

a layer comprising CoX, exchange coupled to the layer of CoFe, the element X comprising a material selected from the group consisting of B, Si, SiB, Ni, Nb, and Y; and a second spacer layer separating the free layer from the layer comprising CoX.

* * * * *

UNITED STATES PATENT AND TRADEMARK OFFICE
CERTIFICATE OF CORRECTION

| | | |
|---|---|---|
| PATENT NO. | : 7,256,972 B2 | Page 1 of 1 |
| APPLICATION NO. | : 10/882472 | |
| DATED | : August 14, 2007 | |
| INVENTOR(S) | : Gill | |

It is certified that error appears in the above-identified patent and that said Letters Patent is hereby corrected as shown below:

In column 6, line 51 "magnetostriction on of each layer" should read --magnetostriction of each layer--;
In column 6, line 53 "material, in addition," should read --material. In addition,--;
In column 6, line 60 "Angstrom is" should read --Angstroms--;

Signed and Sealed this

Twenty-eighth Day of July, 2009

JOHN DOLL
*Acting Director of the United States Patent and Trademark Office*